United States Patent Office 3,355,523
Patented Nov. 28, 1967

3,355,523
BIS-CARBAMOYL SPIROPHOSPHONOTHIOATES
Arthur D. Bliss, Guilford, and Rudi F. W. Rätz, Hamden, Conn., assignors to Olin Mathieson Chemical Corporation, New Haven, Conn., a corporation of Virginia
No Drawing. Filed Mar. 4, 1965, Ser. No. 437,268
17 Claims. (Cl. 260—927)

ABSTRACT OF THE DISCLOSURE

A series of substituted bis-carbamoyl spirophosphonothioates are provided by the reaction of pentaerythritol bis-hydrogen thiophosphite with monofunctional isocyanates and isothiocyanates in an inert solvent. The spirophosphonothioates are useful as agricultural chemicals.

---

This invention relates to substituted bis-carbamoyl spirophosphonothioates having the general formula:

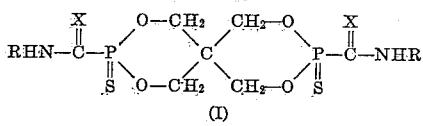

(I)

X being oxygen or sulfur, and R being selected from the class consisting of substituted and unsubstituted aliphatic, cycloaliphatic and aromatic hydrocarbon radicals.

Lucas et al. in J. Am. Chem. Soc., 72, 5491 (1950) have described the preparation of 3,9-dichloro-2,4,8,10-tetraoxa - 3,9 - diphosphaspiro[5.5]undecane by the reaction of pentaerythritol with phosphorus trichloride. This derivative reacts with hydrogen sulfide as shown in Example 1 hereinafter to provide 3,9-H-2,4,8,10-tetraoxa-3,9-diphosphaspiro[5.5]undecane - 3,9 - disulfide. This latter compound may also be referred to as pentaerythritol bis-hydrogen thiophosphite and has the following formula:

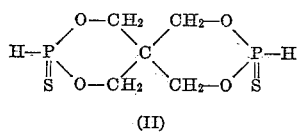

(II)

It has now been found that the bifunctional pentaerythritol bis-hydrogen thiophosphite is a useful intermediate in the preparation of the aforementioned spirophosphonothioates (I). The thiophosphite reacts with monofunctional isocyanates and isothiocyanates to provide the derivatives (I) in accordance with the following equation:

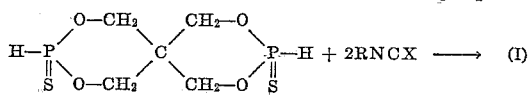

R and X being as hereinbefore defined. The substituted bis-carbamoyl spirophosphonothioates of this invention are characterized by outstanding pesticidal properties, and they are valuable agricultural chemicals.

The reaction of the pentaerythritol bis-hydrogen thiophosphite with monofunctional isocyanates and isothiocyanates is general, and consequently a great number of substituted bis-carbamoyl spirophosphonothioates having the general Formula I are conveniently provided in accordance with the process of this invention. As used in the specification and claims herein, it is to be understood that the phrase "substituted bis-carbamoyl spirophosphonothioates" includes the bis-thiocarbamoyl derivatives of the general Formula I prepared by reaction of the thiophosphite with isothiocyanates as well as the bis-carbamoyl derivatives of the general Formula I prepared by reaction of the thiophosphite with isocyanates.

Thus the process disclosed herein comprises providing the organophosphorus compounds (I) by the reaction of pentaerythritol bis-hydrogen thiophosphite with monofunctional isocyanates and isothiocyanates in an inert solvent. The process can be conveniently performed at a reaction temperature range of about 0° to about 125° C., although generally it has been found that the process is advantageously performed at 20°–50° C., and this is a preferred temperature range.

As mentioned in the preceding discussion an inert solvent must be utilized in the process of this invention. Any solvent which does not react with either the thiophosphite or the isocyanate or isothiocyanate reactants may be suitably employed. Thus for instance, alcohols and amines are obviously not suitable for use in the preparation of the compounds (I) in view of their reactivity with isocyanates and isothiocyanates. It has been found that aliphatic carboxylic acid N,N-dialkyl amide solvents are preferably utilized in the preparation of the derivatives (I). Particularly useful solvents of this nature are the lower alkyl substituted derivatives of formamide and acetamide, and in this respect dimethylformamide and dimethylacetamide are preferred solvents. Other solvents which may be utilized in the preparation of the desired derivatives are methylene chloride and cyclic ethers such as dioxane and tetrahydrofuran.

Although isocyanates and isothiocyanates do react with the thiophosphite without the necessary use of a catalyst, it is preferred to utilize a basic catalyst in the preparation of the derivatives (I) in order to obtain the highest yields of the substituted bis-carbamoyl spirophosphonothioates in a reasonable period. Thus it has been found that basic catalysts such as the alkali metal alkoxides may be advantageously employed in the process of this invention. Particularly useful catalysts of this nature are lithium, sodium and potassium methoxides, ethoxides, and the like. Generally, the catalyst is employed in an amount of from about 0.1% to about 2% by weight of the starting thiophosphite reactant.

After the reaction is completed, the desired compounds are readily isolated by conventional procedures. For example, when a solvent has been employed which is miscible with water, the product can be conveniently isolated by pouring the reaction mixture into water and filtering the insoluble product from the aqueous mixture. When solvents such as methylene chloride are employed in the practice of this invention, they are conveniently removed from the reaction mixture by distillation or evaporation techniques to provide a crude solid reaction product. The substituted bis-carbamoyl spirophosphonothioates of this invention are obtained in pure form by recrystallization from various appropriate solvents.

Although a great number of derivatives having the general Formula I may be provided in accordance with this invention, preferred embodiments include those substituted bis-carbamoyl spirophosphonothioates (I) wherein R is selected from the class consisting of alkyl having 1–18 carbon atoms, alkenyl having 3–8 carbon atoms, cycloalkyl having 5–7 carbon atoms, aryl having 6–10 carbon atoms, halogenated phenyl, nitrated phenyl, phenyl having a lower alkoxy substituent (i.e., 1–3 carbon atoms), benzyl and alkylthiomethyl having 2–5 carbon atoms.

Thus illustrative of some of the isocyanates which may be employed in the reaction with the thiophosphite (II) to provide preferred embodiments of this invention are: methyl, ethyl, n-propyl, isopropyl, n-butyl, isobutyl, n-hexyl, 3-hexyl, n-heptyl, 4-heptyl, n-octyl, 2-ethylhexyl, n-decyl, 4-butyloctyl, octadecyl, allyl, methallyl, crotyl, α-ethylallyl, β-ethylallyl, cyclopentyl, cyclohexyl, cycloheptyl, phenyl, o-tolyl, m-tolyl, p-tolyl, 1-naphthyl, 2-naphthyl, 2,6-xylyl, 2-chlorophenyl, 3-chlorophenyl, 4-chlorophenyl, 4 - bromophenyl, 3,4 - dichlorophenyl, 4-fluorophenyl, 2,4-dibromophenyl, 2,5-dichlorophenyl, 2- nitrophenyl, 3-nitrophenyl, 4-nitrophenyl, 2,4-dinitrophenyl, 3,5-dinitrophenyl, 2,4,6-trinitrophenyl, 3-methoxyphenyl, 4-methoxyphenyl, p-ethoxyphenyl, and benxyl isocyanates.

Likewise monofunctional isothiocyanates of analogous structure to the foregoing isocyanates may be utilized in the practice of this invention. The isothiocyanate reactants are available and are conveniently provided by conventional methods as, for instance, by reacting the corresponding isocyanates with phosphorus pentasulfide or by reacting the corresponding amines with thiophosgene. Illustrative of isothiocyanates which are suitable for reaction with the thiophosphite (II) to provide preferred embodiments of this invention are: phenyl, tolyl, 2,6-xylyl, o-bromophenyl, m-bromophenyl, p-bromophenyl, 3-bromotolyl, o-chlorophenyl, m-chlorophenyl, p-chlorophenyl, 2,4-dibromophenyl, 2,5-dichlorophenyl, p-fluorophenyl, p-methoxyphenyl, m-propoxyphenyl, o-nitrophenyl, m-nitrophenyl, p-nitrophenyl, methyl, ethyl, propyl, isopropyl, butyl, isobutyl, n-hexyl, sec. hexyl, 3-hexyl, n-heptyl, 4-heptyl, n-octyl, iso-octyl, 2-ethylhexyl, n-nonyl, n-decyl, n-dodecyl, 4-butyloctyl, n-tridecyl, n-octadecyl, allyl, benzyl and m-methoxybenzyl isothiocyanates.

Similarly alkylthiomethyl isothiocyanates can be reacted with the thiophosphite to provide bis-thiocarbamoyl spirophosphonothioates included in the general Formula I in accordance with this invention. These isothiocyanate reactants are readily available in accordance with the method disclosed by Böhme et al. in Ann., 563, 54 (1949), and compounds of this nature wherein the alkyl group contains 1–4 carbon atoms are particularly suitable for use in the practice of this invention.

The substituted bis-carbamoyl spiropheosphonothioates (I) are valuable agricultural chemicals since they are effective pesticides in several areas of application. They are particularly useful fungicides, and they are effective both as foliar and soil fungicides against a variety of harmful pathogens. For instance, they are useful in controlling the growth of the early blight, rust and powdery mildew pathogens on the tomato, bean and cucumber host plants respectively. The compounds of this invention have also exhibited excellent nematocidal properties particularly against root-knot nematodes. Furthermore, a number of the compounds (I) also have phytotoxic properties toward a variety of undesirable weed growth.

Although the derivatives (I) can be utilized in pure form in the aforementioned application areas, it is more practical and convenient to utilize them in a dispersed form admixed with a major amount of a suitable carrier or extending agent. For example, a variety of pesticidal compositions including solutions, suspensions and emulsions of the active ingredient dispersed in a liquid carrier are provided as a result of this invention. Likewise the substituted bis-carbamoyl spirophosphonothioates can be admixed with solid carriers to provide powders, dusts, and granular compositions which are convenient to apply to areas where pest control is desired. The solid pesticidal compositions having the derivatives (I) as active ingredient also should preferably contain a small amount of a wetting agent so that aqueous dispersions of powders, dusts, etc., which may be sprayed can be prepared.

The following examples will serve to illustrate the preparation of several of the novel derivatives included in the general Formula I.

Example 1

A solution of 402 g. of crude 3,9-dichloro-2,4,8,10-tetraoxa-3,9-diphosphaspiro[5.5]undecane in 1 liter of freshly distilled dimethylacetamide was prepared and placed in a 2 liter three-necked flask equipped with a stirrer, gas inlet tube and condenser. The condenser was connected with a calcium chloride tube for moisture protection. A moderate stream of dry hydrogen sulfide was passed for 2.5 hours into the solution while the flask was immersed in an ice bath. The thick creamy mixture was divided into four equal portions and each portion was poured into 2 liters of cold water. The resulting almost white solid was collected by filtration and washed four times with 1 liter portions of water. The chlorine-free product was dried in a gentle current of warm air for 62 hours. Yield: 324 g. (82.5%), M.P. 196°–198° C. Recrystallization from glacial acetic acid (16 ml./g.) gave 60% recovery of shining plates, M.P. 202°–204° C. A small additional amount, M.P. 203°–204° C., could be recovered by adding ether to the filtrate. The compound is readily soluble in acetone, sparingly soluble in ether, and insoluble in water. The following analytical data revealed that the desired pentaerythritol bis-hydrogen thiophosphite had been obtained.

Analysis.—Calcd. for $C_5H_{10}O_4P_2S_2$: C, 23.05; H, 3.85; P, 23.83; S, 24.60. Found: C, 23.14; H, 3.86; P, 2370; S, 24.19.

Example 2

A 25 ml. Erlenmeyer flask was charged with 0.65 g. of pentaerythritol bis-hydrogen thiophosphite and 0.595 g. of methylthiomethyl isothiocyanate, prepared by the method of H. Böhme, H. Fischer and R. Frank, Ann., 563, 54 (1949). The mixture was dissolved in 5 ml. of N,N-dimethlacetamide, stirred and treated with a catalytic amount of sodium methylate. The solution immediately warmed to 45°–50° C. and turned deep yellow. When the solution had cooled to room temperature, it was poured into 75 ml. of cold water, producing a slightly sticky yellow solid. Filtration, followed by washing with water then with ethanol, gave 1.2 g. of granular yellow solid melting at 164°–167° C. Two recrystallizations from mixed alcohol-acetone solvent gave brilliant yellow platelets melting at 169°–170° C. The following analytical data revealed that 3,9-bis(N[methylthiomethyl]thiocarbamoyl)2,4,8,10 - tetraoxa - 3,9 - diphosphaspiro[5.5]undecane-3,9-disulfide had been prepared.

Analysis.—Calcd. for $C_{11}H_{20}N_2O_4P_2S_6$: C, 26.49; H, 4.04; N, 5.62; P, 12.42. Found: C, 25.95; H, 4.25; N, 5.88; P, 12.31.

Example 3

Using the procedure of Example 2, 1.867 g. of pentaerythritol bis-hydrogen thiophosphite and 1.910 g. of ethylthiomethyl isothiocyanate were reacted in N,N-dimethylacetamide solvent to give 3.5 g. of yellow solid melting at 138°–140° C. Recrystallization from ethanol gave 2.9 g. melting at 145°–146° C. The following analytical data revealed that 3,9-bis(N-[ethylthiomethyl]thiocarbamoyl)2,4,8,10 - tetraoxa - 3,9 - diphosphaspiro-[5.5]undecane-3,9-disulfide had been prepared.

Analysis.—Calcd. for $C_{13}H_{24}N_2O_4P_2S_6$: C, 29.64; H, 4.59; N, 5.32; P, 11.76. Found: C, 29.15; H, 4.62; N, 5.70; P, 11.80.

Example 4

According to the procedure of Example 2, 5.2 g. of pentaerythritol bis-hydrogen thiophosphite and 3.5 g. of ethyl isothiocyanate were reacted to give 6.1 g. of product which melted at 186°–187° C. after recrystallization from ethanol. The following analytical data showed that 3,9 - bis(N - ethylthiocarbamoyl)2,4,8,10 - tetraoxa - 3,9-diphosphaspiro[5.5]undecane-3,9-disulfide had been prepared.

Analysis.—Calcd. for $C_{11}H_{20}N_2O_4P_2S_4$: C, 30.40; H, 4.64; N, 6.45; P, 14.26. Found: C, 30.45; H, 4.60; N, 6.66; P, 13.81.

Example 5

Using the procedure of Example 2, 2.60 g. of pentaerythritol bis-hydrogen thiophosphite and 1.98 g. of allyl isothiocyanate were reacted to yield, after recrystallization from ethanol, 2.5 g. of product melting at 148°–149° C. The following analytical data revealed that 3,9-bis(N-allylthiocarbamoyl)2,4,8,10 - tetraoxa - 3,9 - diphosphaspiro[5.5]undecane-3,9-disulfide had been prepared.

5

*Analysis.*—Calcd. for $C_{13}H_{20}N_2O_4P_2S_4$: C, 34.05; H, 4.40; N, 6.11; P, 13.51. Found: C, 34.21; H, 4.44; N, 6.40; P, 13.40.

Example 6

Pentaerythritol bis-hydrogen thiophosphite, 5.2 g., and n-butyl isocyanate, 4.4 g., were reacted in N,N-dimethyl acetamide solvent in a manner similar to that employed in Example 2 except that no sodium methylate catalyst was used. The product, which weighed 8.4 g., was obtained in the form of white needles melting at 209°–210° C. after recrystallization from ethanol. The following data revealed that 3,9-bis(N-n-butylcarbamoyl)2,4,8,10-tetraoxa - 3,9 - diphosphaspiro[5.5]undecane - 3,9 - disulfide had been obtained.

*Analysis.*—Calcd. for $C_{15}H_{28}N_2O_6P_2S_2$: C, 39.29; H, 6.16; N, 6.11; P, 13.51. Found: C, 39.50; H, 6.18; N, 6.42; P, 13.43.

Example 7

Using the procedure of Example 6, 5.2 g. of pentaerythritol bis-hydrogen thiophosphite and 6.1 g. of p-chlorophenyl isocyanate were reacted to give 5.4 g. of product melting at 239°–240° C. with decomposition after recrystallization from a mixture of ethanol and acetone. The following data revealed that 3,9-bis(N-[p-chlorophenyl]carbamoyl)2,4,8,10 - tetraoxa - 3,9 - diphosphaspiro[5.5]undecane-3,9-disulfide had been prepared.

*Analysis.*—Calcd. for $C_{19}H_{18}Cl_2N_2O_6P_2S_2$: C, 40.22; H, 3.20; Cl, 12.5; N, 4.94; P, 10.92. Found: C, 40.50; H, 3.17; Cl, 12.6; N, 5.12; P, 10.66.

Example 8

Using the procedure of Example 6, 7.8 g. of pentaerythritol bis-hydrogen thiophosphite and 3.4 g. of methyl isocyanate were reacted to give 8.5 g. of product melting at 250°–251° C. with decomposition after recrystallization from acetone. The following data revealed that 3,9-bis(N - methylcarbamoyl)2,4,8,10 - tetraoxa - 3,9 - diphosphaspiro[5.5]undecane-3,9-disulfide had been prepared.

*Analysis.*—Calcd. for $C_9H_{16}N_2O_6P_2S_2$: C, 28.88; H, 4.31; N, 7.48; P, 16.55. Found: C, 29.15; H, 4.27; N, 7.44; P, 16.80.

Example 9

Using the procedure of Example 6, 2.6 g. of pentaerythritol bis-hydrogen thiophosphite and 4.8 g. of phenyl isocyanate were reacted to give 5.2 g. of product melting at 227°–228° C. with decomposition after recrystallization from mixed ethanol-acetone solvent. The following data revealed that 3,9-bis(N-phenylcarbamoyl)2,4,8,10-tetraoxa - 3,9 - diphosphaspiro[5.5]undecane - 3,9 - disulfide had been prepared.

*Analysis.*—Calcd. for $C_{19}H_{20}N_2O_6P_2S_2$: C, 45.78; H, 4.04; P, 12.43. Found: C, 46.02; H, 4.15; P, 12.27.

Example 10

Using the procedure of Example 6, 5.2 g. of pentaerythritol bis-hydrogen thiophosphite and 7.5 g. of 3,4-dichlorophenyl isocyanate were reacted to give 5.6 g. of product melting at 215°–216° C. with decomposition after recrystallization from ethanol. The following data showed that 3,9-bis(N-[3',4'-dichlorophenyl]carbamoyl)2,4,8,10 - tetraoxa - 3,9 - diphosphaspiro[5.5]undecane-3,9-disulfide had been prepared.

*Analysis.*—Calcd. for $C_{19}H_{16}Cl_4N_2O_6P_2S_2$: C, 35.87; H, 2.54; Cl, 22.3; P, 9.74. Found: C, 35.93; H, 2.24; Cl, 22.6; P, 9.55.

Example 11

Using the procedure of Example 6, 5.2 g. of pentaerythritol bis-hydrogen thiophosphite and 7.5 g. of 2,5-dichlorophenyl isocyanate were reacted to give 8.7 g. of product melting at 252°–253° C. with decomposition after two recrystallizations from dioxane. The following data showed that 3,9-bis(N-[2',5'-dichlorophenyl]carbamoyl)2,4,8,10 - tetraoxa - 3,9 - diphosphaspiro[5.5]undecane-3,9-disulfide had been obtained.

*Analysis.*—Calcd. for $C_{19}H_{16}Cl_4N_2O_6P_2S_2$: C, 35.87; H, 2.54; Cl, 22.3; P, 9.74. Found: C, 36.37; H, 2.54; Cl, 23.1; P, 9.57.

What is claimed is:

1. Substituted bis-carbamoyl spirophosphonathioates having the formula:

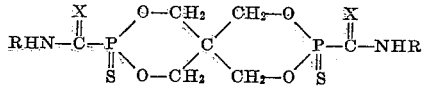

wherein X is selected from the class consisting of oxygen and sulfur; and wherein R is selected from the class consisting of alkyl having 1–18 carbon atoms, alkenyl having 3–8 carbon atoms, cycloalkyl having 5–7 carbon atoms, aryl having 6–10 carbon atoms, halogenated phenyl, nitrated phenyl, phenyl having a lower alkoxy substituent, benzyl and alkylthiomethyl having 2–5 carbon atoms.

2. Bis-carbamoyl spirophosphonothioates having the formula:

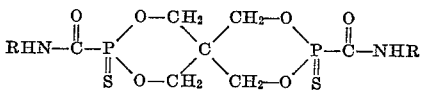

R being alkyl having 1–18 carbon atoms.

3. 3,9-bis(N-methylcarbamoyl)2,4,8,10 - tetraoxa-3,9-diphosphaspiro[5.5] undecane-3,9-disulfide.

4. 3,9-bis(N-n-butylcarbamoyl)2,4,8,10 - tetraoxa-3,9-diphosphaspiro[5.5]undecane-3,9-disulfide.

5. Bis-carbamoyl spirophosphonothioates having the formula:

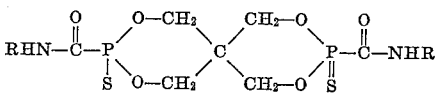

R being aryl having 6–10 carbon atoms.

6. 3,9-bis(N-phenylcarbamoyl)2,4,8,10 - tetraoxa-3,9-diphosphaspiro[5.5]undecane-3,9-disulfide.

7. Bis-carbamoyl spirophosphonothioates having the formula:

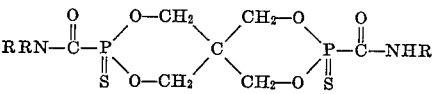

R being halogenated phenyl.

8. 3,9 - bis(N - [p - chlorophenyl]carbamoyl)2,4,8,10-tetraoxa-3,9-diphosphaspiro[5.5]undecane-3,9-disulfide.

9. 3,9-bis(N-[3',4' - dichlorophenyl]carbamoyl)2,4,8,10-tetraoxa-3,9 - diphosphaspiro[5.5]undecane-3,9-disulfide.

10. 3,9-bis(N-[2',5' - dichlorophenyl]carbamoyl)2,4,8,10-tetraoxa-3,9-diphosphaspiro[5.5]undecane - 3,9-disulfide.

11. Bis-thiocarbamoyl spirophosphonothioates having the formula:

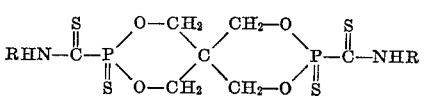

R being alkyl having 1–18 carbon atoms.

12. 3,9-bis(N - ethylthiocarbamoyl)2,4,8,10 - tetraoxa-3,9-diphosphaspiro[5.5]undecane-3,9-disulfide.

13. Bis-thiocarbamoyl spirophosphonothioates having the formula:

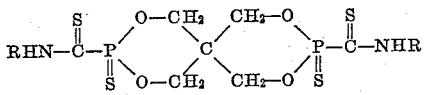

R being alkylthiomethyl having 2–5 carbon atoms.

14. 3,9-bis(N - [methylthiomethyl]thiocarbamoyl)2,4,8,10 - tetraoxa - 3,9 - diphosphaspiro[5.5]undecane - 3,9-disulfide.

15. 3,9 - bis(N - [ethylthiomethyl]thiocarbamoyl)2,4,8,10 - tetraoxa - 3,9 - diphosphaspiro[5.5]undecane-3,9-disulfide.

16. Bis-thiocarbamoyl spirophosphonothioates having the formula:

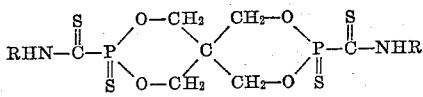

R being alkenyl having 3–8 carbon atoms.

17. 3,9 - bis(N - allylthiocarbamoyl)2,4,8,10-tetraoxa-3,9-diphosphaspiro[5.5]undecane-3,9-disulfide.

References Cited

UNITED STATES PATENTS 2,909,558  10/1959  Reetz _____ 260—970 X

CHARLES B. PARKER, *Primary Examiner.*

A. H. SUTTO, *Assistant Examiner.*